US012735642B2

(12) United States Patent
Hiraiwa et al.

(10) Patent No.: US 12,735,642 B2
(45) Date of Patent: Sep. 15, 2026

(54) APPARATUS FOR CARBONIZING BIOMASS

(71) Applicant: Mitsubishi UBE Cement Corporation, Tokyo (JP)

(72) Inventors: Yuusuke Hiraiwa, Chiyoda-ku (JP); Shigeya Hayashi, Chiyoda-ku (JP); Nobuyuki Ooi, Chiyoda-ku (JP)

(73) Assignee: Mitsubishi UBE Cement Corporation, Tokyo (JP)

( * ) Notice: Subject to any disclaimer, the term of this patent is extended or adjusted under 35 U.S.C. 154(b) by 131 days.

(21) Appl. No.: 18/550,439

(22) PCT Filed: Jan. 21, 2022

(86) PCT No.: PCT/JP2022/002216
§ 371 (c)(1),
(2) Date: Sep. 13, 2023

(87) PCT Pub. No.: WO2022/209196
PCT Pub. Date: Oct. 6, 2022

(65) Prior Publication Data
US 2024/0150658 A1 May 9, 2024

(30) Foreign Application Priority Data
Mar. 29, 2021 (JP) ................................ 2021-055518

(51) Int. Cl.
*C10B 47/30* (2006.01)
*C10B 1/10* (2006.01)
(Continued)

(52) U.S. Cl.
CPC ................ *C10B 47/30* (2013.01); *C10B 1/10* (2013.01); *C10B 41/08* (2013.01); *C10B 43/14* (2013.01);
(Continued)

(58) Field of Classification Search
CPC ........... C10B 1/10; C10B 47/30; C10B 53/02; C10B 15/02; C10B 43/10; C10B 43/12; C10B 43/14
See application file for complete search history.

(56) References Cited

U.S. PATENT DOCUMENTS 2,192,011 A * 2/1940 Koller ..................... C10B 43/14 48/190
2,423,157 A * 7/1947 Reiss ...................... C10B 43/10 110/341
(Continued)

FOREIGN PATENT DOCUMENTS

JP H09-196337 A 7/1997
JP 2001-334242 A 12/2001
(Continued)

OTHER PUBLICATIONS

PE2E English langauge translation of WO-2019069860-A1.*
(Continued)

*Primary Examiner* — Jonathan Luke Pilcher
(74) *Attorney, Agent, or Firm* — Studebaker Brackett PLLC

(57) ABSTRACT

A biomass carbonizing apparatus (100) includes a rotary kiln (2) as a carbonization furnace configured to carbonize biomass, a combustion furnace (41) configured to combust gas discharged from the carbonization furnace, a duct (42) connecting the carbonization furnace and the combustion furnace, and an oxygen-containing gas feed unit (45) configured to feed oxygen-containing gas to the duct during operation of the carbonization furnace.

1 Claim, 2 Drawing Sheets

(51) Int. Cl.

| | |
|---|---|
| ***C10B 41/08*** | (2006.01) |
| ***C10B 43/14*** | (2006.01) |
| ***C10B 53/02*** | (2006.01) |
| ***C10B 57/14*** | (2006.01) |
| ***F23G 7/06*** | (2006.01) |
| ***F27D 17/30*** | (2025.01) |

(52) U.S. Cl.

CPC .............. *C10B 53/02* (2013.01); *C10B 57/14* (2013.01); *F23G 7/06* (2013.01); *F27D 17/30* (2025.01)

(56) References Cited

U.S. PATENT DOCUMENTS

| | | | | | |
|---|---|---|---|---|---|
| 4,178,266 | A * | 12/1979 | Burkert | C10K 3/00 | 48/190 |
| 4,840,129 | A * | 6/1989 | Jelinek | C10B 53/00 | 202/112 |
| 4,878,440 | A * | 11/1989 | Tratz | F23G 5/006 | 110/259 |
| 5,425,792 | A * | 6/1995 | Bishop | C10K 1/026 | 75/505 |
| 5,656,044 | A * | 8/1997 | Bishop | C10J 3/002 | 48/197 R |
| 5,851,246 | A * | 12/1998 | Bishop | C10J 3/14 | 422/209 |
| 6,178,899 | B1 * | 1/2001 | Kaneko | F23G 5/006 | 110/235 |
| 8,100,991 | B2 * | 1/2012 | Sasauchi | C10J 3/84 | 423/644 |
| 8,198,493 | B1 * | 6/2012 | Livingston | C10B 47/30 | 202/136 |
| 8,882,493 | B2 * | 11/2014 | Vandergriendt | F23D 23/00 | 431/278 |
| 9,150,791 | B2 * | 10/2015 | Ben-Tovim | F26B 11/0445 | |
| 9,494,313 | B2 * | 11/2016 | Okazaki | C10B 57/10 | |
| 10,184,082 | B2 * | 1/2019 | Endou | C10B 37/00 | |
| 10,301,564 | B2 * | 5/2019 | Martella | C10K 1/06 | |
| 10,377,952 | B2 * | 8/2019 | Endou | C10B 53/02 | |
| 11,198,829 | B2 * | 12/2021 | Hiraiwa | C10B 41/00 | |
| 11,667,863 | B2 * | 6/2023 | Hiraiwa | C10B 53/08 | 44/590 |
| 2014/0373435 | A1 * | 12/2014 | Nakagawa | C10L 5/04 | 44/621 |
| 2014/0373436 | A1 * | 12/2014 | Nakagawa | C10L 9/08 | 44/629 |
| 2015/0021158 | A1 * | 1/2015 | Nakagawa | C10B 57/10 | 202/96 |
| 2016/0024389 | A1 * | 1/2016 | Endou | F01K 11/02 | 60/670 |
| 2016/0177183 | A1 * | 6/2016 | Atarashiya | C10B 21/18 | 202/109 |
| 2020/0239800 | A1 * | 7/2020 | Hiraiwa | C10L 5/442 | |
| 2021/0324285 | A1 * | 10/2021 | Hiraiwa | C10B 53/02 | |
| 2024/0002730 | A1 * | 1/2024 | Hayashi | F27B 7/08 | |

FOREIGN PATENT DOCUMENTS

| | | | | |
|---|---|---|---|---|
| JP | 2002-364816 | A | 12/2002 | |
| JP | 2004-010773 | A | 1/2004 | |
| JP | 2004-294003 | A | 10/2004 | |
| JP | 2005-113018 | A | 4/2005 | |
| JP | 4224920 | B2 * | 2/2009 | |
| JP | 2013-155302 | A | 8/2013 | |
| JP | 5713592 | B2 * | 5/2015 | |
| JP | 2015-174980 | A | 10/2015 | |
| WO | 2014/168004 | A1 | 10/2014 | |
| WO | 2015/004773 | A1 | 1/2015 | |
| WO | WO-2019069860 | A1 * | 4/2019 | C10B 41/00 |
| WO | WO-2020044696 | A1 * | 3/2020 | C10B 47/30 |

OTHER PUBLICATIONS

PE2E English langauge translation of WO-2020044696-A1.*
PE2E English language translation of JP-5713592-B2.*
PE2E English language translation of JP-4224920-B2.*
International Preliminary Report on Patentability (Chapter I) and Written Opinion of the International Searching Authority issued in PCT/JP2022/002216; Notification mailed Oct. 12, 2023.
International Search Report issued in PCT/JP2022/002216; mailed Mar. 15, 2022.

* cited by examiner

APPARATUS FOR CARBONIZING BIOMASS

TECHNICAL FIELD

The present disclosure relates to a biomass carbonizing apparatus.

BACKGROUND ART

In a facility for carbonizing a raw material, since a by-product generated in a carbonization process may affect the facility, various countermeasures have been studied. For example, Patent Literature 1 discloses a configuration in which air is introduced into a carbonization chamber of a coke oven to combust and remove carbon on an oven wall. Patent Literature 2 and Patent Literature 3 disclose configurations in which adhered matters are combusted by feeding air to a carbonization furnace and a duct while the waste carbonization furnace is stopped.

CITATION LIST

Patent Literature

Patent Literature 1: Japanese Unexamined Patent Publication No. 2015-174980

Patent Literature 2: Japanese Unexamined Patent Publication No. 2004-294003

Patent Literature 3: Japanese Unexamined Patent Publication No. 2004-010773

SUMMARY OF INVENTION

Technical Problem

In a facility for carbonizing biomass, since biomass carbonization produces tar as a by-product, the tar can cause clogging of the facility. However, for example, the method described in Patent Literature 1 is a method for removing adhered matters which are generated in a carbonization chamber for dry distillation of a raw material, and it is not taken into account that a by-product flows to the outside of the carbonization chamber. On the other hand, when the methods described in Patent Literatures 2 and 3 are implemented, it is necessary to stop the carbonization furnace, whereby the operation efficiency can be reduced.

The present disclosure has been made in view of the above circumstances, and it is an object of the present disclosure to provide a technique for efficiently operating a biomass carbonizing apparatus while suppressing clogging of the facility due to adhesion of tar.

Solution to Problem

In order to achieve the above object, the biomass carbonizing apparatus according to an embodiment of the present disclosure includes a carbonization furnace configured to carbonize biomass, a combustion furnace configured to combust gas discharged from the carbonization furnace, a duct connecting the carbonization furnace and the combustion furnace, and an oxygen-containing gas feed unit configured to feed oxygen-containing gas to the duct during operation of the carbonization furnace.

The biomass carbonizing apparatus can combust tar generated in the carbonization furnace in the duct by feeding oxygen-containing gas to the duct, and thus prevent clogging of the facility due to adhesion of tar to the duct. In addition, it is possible to reduce the stoppage of equipment for the purpose of cleaning work and the like by feeding oxygen-containing gas during operation of the carbonization furnace, whereby the biomass carbonizing apparatus can carbonize biomass more efficiently.

The oxygen concentration in the gas in the duct after feeding the oxygen-containing gas may be 10% by volume or less as one mode. In the biomass carbonizing apparatus, the gas discharged from the carbonization furnace may contain dust or the like, and there is a possibility of explosion. On the other hand, by adjusting the oxygen concentration in the duct to 10% by volume or less, it is possible to combust tar while reducing the possibility of explosion in the duct.

The carbonization temperature in the carbonization furnace may be 300° C. or lower as one mode. In a case where the carbonization temperature is 300° C. or lower, since the tar content in the gas discharged from the carbonization furnace is small, the oxygen concentration in the duct increases, and the possibility of explosion may increase. Thus, in a case where the carbonization temperature is 300° C. or lower, the effect of avoiding explosion is more remarkably exhibited by adjusting the oxygen concentration in the duct to 10% by volume or less.

Advantageous Effects of Invention

According to the present disclosure, there is provided a technique of efficiently operating a biomass carbonizing apparatus while suppressing clogging of a facility due to adhesion of tar.

DESCRIPTION OF EMBODIMENTS

Hereinafter, embodiments for carrying out the present disclosure will be described in detail with reference to the accompanying drawings. In the description of the drawings, the same elements are denoted by the same reference signs, and redundant description will be omitted.

[Method for Producing Biomass Solid Fuel]

Figure 1:
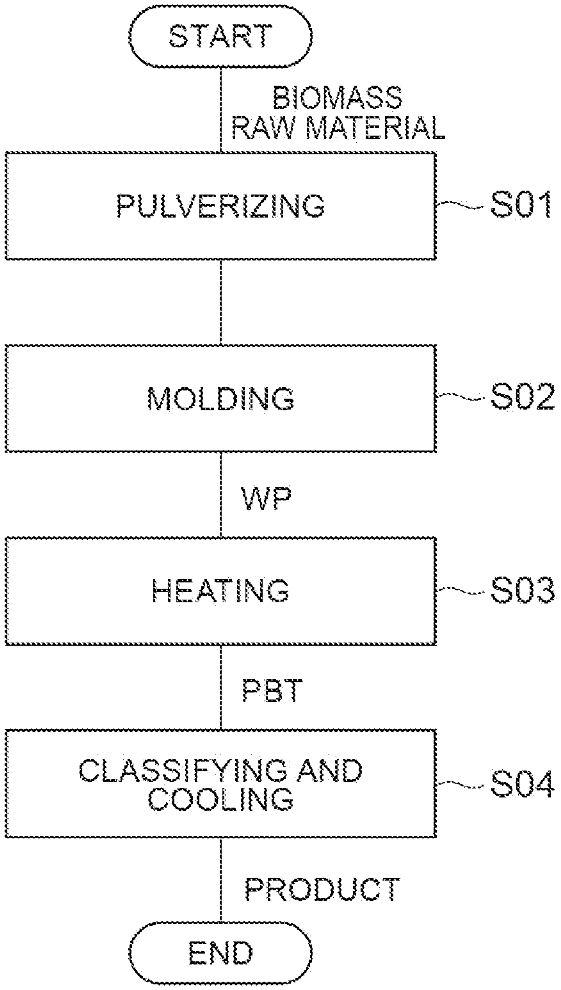
FIG. 1 is a flowchart for illustrating an outline of a method for producing a biomass solid fuel according to an embodiment.

FIG. 1 is a flowchart illustrating an outline of a method for producing a biomass solid fuel performed by a biomass carbonizing apparatus including a biomass carbonizing apparatus according to an embodiment of the present disclosure. As shown in FIG. 1, biomass as a raw material of a biomass solid fuel undergoes a pulverizing step (S01) and a molding step (S02) to become biomass molded into a pellet form (White Pellet: hereinafter referred to as "WP"). This WP is carbonized by being heated in the heating step (S03) to become a biomass solid fuel (Pelletizing Before Torrefaction: hereinafter referred to as "PBT"). This PBT becomes a product through a classifying and cooling step (S04) as necessary.

The pulverizing step (S01) is a step of crushing and then pulverizing biomass as a raw material (biomass raw material). The type of biomass to be a raw material is not particularly limited, and the biomass can be selected from wood-based biomass and plant-based biomass. The tree species, parts, and the like of the biomass to be a raw material are not particularly limited, but for example, as one mode, a raw material containing at least one species selected from the group consisting of a rubber tree, acacia, a tree species belonging to the Dipterocarpaceae, *Pinus radiata*, and a mixture of larch, spruce, and birch can be used. Each of larch, spruce, and birch may be used singly as a biomass raw material, but can be used in mixture of two or more species thereof, preferably in mixture of three species thereof. The raw material containing at least one species selected from the group consisting of spruce, pine, and fir, or a mixture of two or three species thereof can be used.

In addition, other tree species other than those described above may be further contained as a raw material. In one mode of the present disclosure, the content of one or more species selected from the group consisting of a rubber tree, acacia, a tree species belonging to the Dipterocarpaceae, *Pinus radiata*, and a mixture of larch, spruce, and birch is preferably 50% by weight or more, more preferably 80% by weight or more, and may be 100% by weight based on the total weight of the biomass as a raw material.

As a raw material, there may be used, for example, Douglas fir, hemlock, cedar, cypress, European red pine, old almond tree, almond shell, walnut shell, sago palm, EFB (empty fruit bunch that is a residue of palm oil processing), meranti, acacia xylem part, acacia bark, *eucalyptus*, teak, spruce+white birch, or rubber.

The particle size of the biomass after pulverizing is not particularly limited, but can be about 100 μm to 3000 μm on average, and preferably 400 μm to 1000 μm on average. As a method for measuring the particle size of the biomass particles, a known measurement method may be used.

The molding step (S02) is a step of molding the pulverized biomass into a block using a known molding technique. The molded biomass (WP), which is a block of the biomass after molding, can be a pellet or a briquette. The size of WP can be appropriately changed. In the molding step, no binding agent such as a binder is added, and the pulverized biomass is compressed and pressurized for molding.

The heating step (S03) is a step of heating (low-temperature carbonizing) the molded biomass (WP) at 150° C. to 400° C. to obtain a biomass solid fuel (PBT) having strength and water resistance while maintaining the shape as the molded biomass. The heating step is performed using the biomass carbonizing apparatus 100 described later.

The heating temperature (heating temperature of PBT in the kiln main body 20 of the rotary kiln 2 described later: also referred to as carbonization temperature) is appropriately determined depending on the shape and size of the biomass to be a raw material and the biomass block, and is set to 300° C. or lower. The heating temperature in the case of producing PBT from the molded biomass (WP) is preferably 200° C. or higher and 300° C. or lower, and more preferably 230° C. or higher and lower than 300° C. It is still more preferably 230° C. to 280° C. The heating time in the heating step is not particularly limited, but may be 0.2 hours to 3 hours.

The classifying and cooling step (S04) is a step of classifying and cooling in order to commercialize the PBT obtained by the heating step. Classifying and cooling may be omitted, or only one of the steps may be performed. PBT which is classified and cooled as necessary becomes a solid fuel product.

In the biomass solid fuel obtained after the heating step (S03), the COD (Chemical Oxygen Demand) of an immersion water used for water immersion is preferably 3000 ppm or less. Here, the COD (Chemical Oxygen Demand) of an immersion water used for water immersion of a biomass solid fuel (also simply described as "COD") refers to a COD value assayed in accordance with JIS K0102(2019)-17 for a sample of immersion water for COD measurement prepared in accordance with the method described in Japan Environment Agency Announcement No. 13 "Method for detecting a metal or the like contained in an industrial waste", Preparation of first test liquid: Sample liquid (A), 1973.

The biomass solid fuel obtained after the heating step preferably has a grindability index (HGI) based on JIS M 8801 (2008) of 15 or more and 60 or less, and more preferably 20 or more and 60 or less. The biomass solid fuel preferably has a BET specific surface area of 0.15 $m^2/g$ to 0.8 $m^2/g$, more preferably 0.15 $m^2/g$ to 0.7 $m^2/g$. The biomass solid fuel preferably has an equilibrium moisture content after immersion in water of 15% by weight to 65% by weight, and more preferably 15% by weight to 60% by weight.

The biomass solid fuel obtained after the heating step has a fuel ratio (fixed carbon/volatile matter) of 0.2 to 0.8, a dry-basis higher heating value of 4800 kcal/kg to 7000 kcal/kg, a molar ratio of oxygen O to carbon C (O/C) of 0.1 to 0.7, and a molar ratio of hydrogen H to carbon C (H/C) of 0.8 to 1.3. When the physical property values of the biomass solid fuel after the heating step are within the above ranges, it is possible to improve handleability during storage by reducing disintegration while reducing the COD in the water discharged during storage. The physical property values of the biomass solid fuel can be within the above ranges, for example, by adjusting tree species of the biomass used as a raw material, parts thereof, heating temperature in the heating step, and the like. The industrial analysis value, the element analysis value, and the higher heating value in the present specification are based on JIS M 8812 (2006), JIS M 8813 (2006), and JIS M 8814 (2003), respectively.

The biomass solid fuel obtained after the heating step has a maximum temperature reached in the self-heating property test of less than 200° C. The self-heating property test is a test specified in "The United Nations: Recommendations on the Transport of Dangerous Goods: Manual of Tests and Criteria: Fifth revised edition: Test method for self-heating substances".

[Biomass Carbonizing Apparatus]

Figure 2:
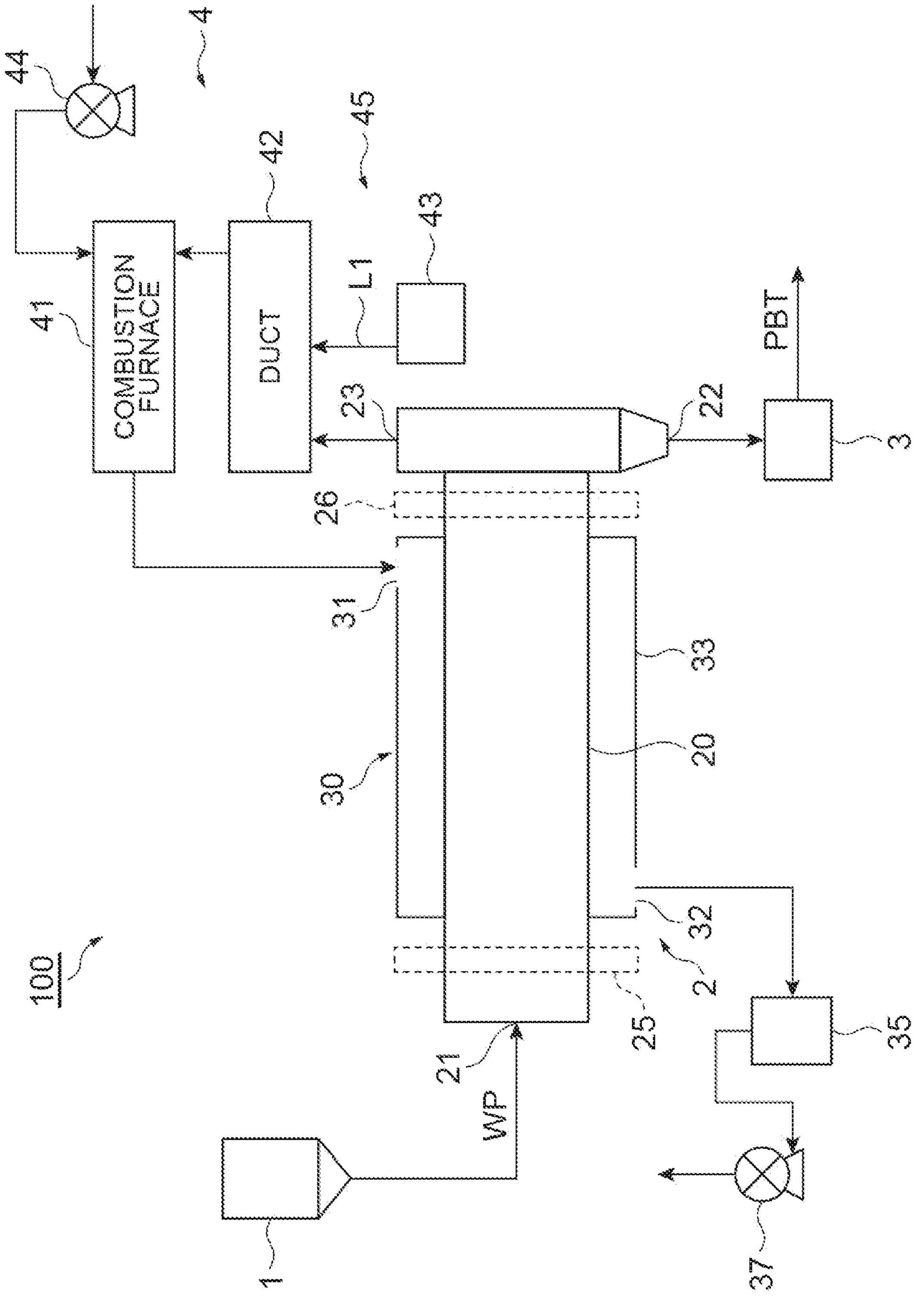
FIG. 2 is a schematic configuration diagram of a biomass carbonizing apparatus according to an embodiment.

Next, the biomass carbonizing apparatus 100 used in the heating step (S03) will be described with reference to FIG. 2. FIG. 2 is a schematic configuration diagram illustrating a biomass carbonizing apparatus used in a heating step.

As illustrated in FIG. 2, the biomass carbonizing apparatus 100 includes a hopper 1, a rotary kiln 2 (carbonization furnace), a cooler 3, and a gas treatment facility 4. The hopper 1 and the rotary kiln 2 are controlled by a control unit (not illustrated).

The hopper 1 has a function of storing molded biomass (WP). The WP stored in the hopper 1 is sequentially fed to the rotary kiln 2 and heated in the rotary kiln 2. By heating the WP, a biomass solid fuel (PBT) is produced. The PBT produced by the rotary kiln 2 is discharged from the rotary kiln 2 and then cooled by the cooler 3.

The rotary kiln 2 is a so-called external beating type. The rotary kiln 2 includes a kiln main body 20 in which WP as an object to be heated is introduced and heated (low-temperature carbonized), and a heating unit 30 for heating the kiln main body 20.

The kiln main body 20 has a substantially cylindrical shape, and molded biomass (WP) as an object to be heated is introduced into the kiln main body from an end on one side, and a biomass solid fuel (PBT) after beating (low-temperature carbonizing) is discharged from an end on the other side. Thus, an introduction port 21 for introducing the molded biomass is provided at the end on one side of the kiln main body 20. A biomass solid fuel (PBT) discharge port 22 through which PBT carbonized by being heated in the kiln main body 20 is discharged and a gas discharge port 23 through which pyrolysis gas generated in the kiln main body 20 is discharged are provided at the other end of the kiln main body 20. The PBT discharge port 22 may be provided below the kiln main body 20, and the gas discharge port 23 may be provided above the kiln main body 20.

The kiln main body 20 is supported by an upstream roller 25 and a downstream roller 26 so as to be rotatable about an axis extending in the moving direction of the WP. That is, the central axis of the kiln main body 20 serves as a rotation axis of the kiln main body 20.

The kiln main body 20 is installed in an inclined state such that an upstream side (introduction port 21 side) is an upper side and a downstream side (PBT discharge port 22 side) is a lower side. The installation angle of the kiln main body 20 can be appropriately changed depending on the size of the kiln main body 20, the moving speed of WP in the kiln main body 20, and the like.

The heating unit 30 has a heat gas path 33 including a gas inlet 31 and a gas outlet 32. The heat gas path 33 is provided around the kiln main body 20. The heat gas is fed from a gas inlet 31 provided on the outer peripheral side of the kiln main body 20, passes through a heat gas path 33, and is discharged from a gas outlet 32. The kiln main body 20 is heated in the rotary kiln 2 by the heat gas flowing through the heat gas path 33. Furthermore, by appropriately changing the temperature of the heat gas fed to the heat gas path 33, the temperature of the kiln main body 20 of the rotary kiln 2 can be controlled. The heat gas fed to the heat gas path 33 is a gas combusted in the combustion furnace described later. This point will be described later.

The heat gas discharged from the gas outlet 32 may be released to the atmosphere via the induced draft fan 37 after dust is collected by the cyclone 35.

Note that the rotary kiln 2 in FIG. 2 is a countercurrent system in which a moving direction of the object to be heated (WP)(a direction from the introduction port 21 toward the PBT discharge port 22) and a moving direction of the heat gas are opposed to each other, but may be a co-current flow system. The oxygen concentration in the rotary kiln 2 may be adjusted to 10% or less.

The cooler 3 has a function of cooling the biomass solid fuel (PBT) discharged from the rotary kiln 2 to about normal temperature. Since the biomass solid fuel (PBT) has water resistance, for example, a system of directly spraying water on the biomass solid fuel (PBT) to cool the biomass solid fuel may be used as the cooler 3.

The pyrolysis gas discharged from the gas discharge port 23 of the kiln main body 20 is introduced into the gas treatment facility 4. The gas treatment facility 4 includes a combustion furnace 41 and a duct 42.

The combustion furnace 41 combusts the pyrolysis gas generated in the kiln main body 20. The duct 42 is provided between the gas discharge port 23 of the kiln main body 20 and the combustion furnace 41, and introduces the pyrolysis gas discharged from the gas discharge port 23 into the combustion furnace 41. To the duct 42, oxygen-containing gas fed from a gas feed source 43 is fed via a path L1. The path L1 is composed of, for example, a pipe. The gas feed source 43 and the path L1 for feeding the oxygen-containing gas from the gas feed source 43 to the duct 42 function as an oxygen-containing gas feed unit 45. This point will be described later.

The pyrolysis gas fed from the kiln main body 20 via the duct 42 and air fed from the outside via an air fan 44 are introduced into the combustion furnace 41. In this way, the pyrolysis gas is combusted at a high temperature in the combustion furnace 41. The pyrolysis gas is fully combusted. The high-temperature exhaust gas generated by combustion is introduced into the heat gas path 33 from the gas inlet 31 of the heating unit 30 via a pipe. As described above, the exhaust gas generated by combustion in the combustion furnace 41 can be used as heat gas for heating the kiln main body 20 in the rotary kiln 2.

The pyrolysis gas to be treated in the gas treatment facility 4 contains tar generated by carbonization of molded biomass (WP) in the kiln main body 20. The tar is gaseous at the stage when the pyrolysis gas is discharged from the kiln main body 20, but may change to liquid due to temperature drop while moving through the duct 42. Thus, when the pyrolysis gas is fed to the combustion furnace 41 via the duct 42, tar may be deposited in the duct 42. It is also conceivable that an increase in the tar deposited in the duct 42 causes clogging of the facility.

On the other hand, by feeding oxygen-containing gas to the duct 42 from the oxygen-containing gas feed unit 45, an environment in which tar is easily combusted in the duct 42 is configured in the gas treatment facility 4.

The oxygen-containing gas fed from the gas feed source 43 via the path L1 is fed into the duct 42 to combust the tar in the duct 42. Combustion of the tar decomposes the tar and prevents the tar from adhering into the duct 42.

After feeding the oxygen-containing gas to the duct 42, the oxygen concentration of the gas in the duct 42 may be 10% by volume or less. The oxygen concentration of the gas in the duct 42 may be greater than 10% by volume as long as the tar can be combusted. However, certain combustibles contained in the pyrolysis gas fed into the duct 42 may cause an explosion in the duct 42 by feeding the oxygen-containing gas into the duct 42. In particular, as in the present embodiment, the pyrolysis gas generated by carbonization of molded biomass (WP) can contain dust. For this reason, a dust explosion may occur in the duct 42. On the other hand, by adjusting the oxygen concentration of the gas in the duct 42 to 10% by volume or less, it is possible to suppress the occurrence of an explosion, particularly a dust explosion, in the duct 42. When the oxygen concentration in the gas in the duct 42 is 2% by volume or more, tar is easily combusted in the duct 42. Examples of the component other than oxygen contained in the oxygen-containing gas include inert gases such as nitrogen ($N_2$) and argon (Ar).

The feed of the oxygen-containing gas to the duct 42 is performed during operation of the rotary kiln 2. While molded biomass (WP) is heated and carbonized in the rotary kiln 2, pyrolysis gas containing tar can be fed into the duct 42 from the gas discharge port 23. Thus, by feeding the oxygen-containing gas during operation of the rotary kiln 2, the tar fed into the duct 42 can be combusted before staying and adhering into the duct 42. Note that a configuration in which the oxygen-containing gas is fed continuously (for example, always) during operation of the rotary kiln 2 may be adopted or a configuration in which the oxygen-containing gas is fed intermittently during operation of the rotary kiln 2 may be adopted. When the configuration in which the oxygen-containing gas is always fed is adopted, the combustion of tar in the duct 42 can be realized with a simpler configuration.

The feed rate of the oxygen-containing gas to the duct 42 is not particularly limited as long as the tar can be combusted in the duct 42. The feed rate of the oxygen-containing gas can be adjusted depending on, for example, whether the oxygen-containing gas is continuously fed or intermittently fed to the duct 42. The feed rate of the oxygen-containing gas suitable for combustion of tar can also be changed depending on the characteristics of the pyrolysis gas fed from the rotary kiln 2. That is, how to feed the oxygen-containing gas (timing of feeding, feed rate, and the like) can be appropriately changed depending on the operating conditions of the rotary kiln 2. With regard to the "combustion of tar in the duct 42" in the present embodiment, it is not assumed that tar is completely combusted in the duct 42, and it is sufficient that tar is combusted to such an extent that adhesion of tar on the wall surface in the duct 42 does not proceed.

Further, the position where the path L1 for feeding the oxygen-containing gas to the duct 42 is connected to the duct 42, that is, the position where the oxygen-containing gas is introduced into the duct 42 is not particularly limited, and the path L1 can be provided at an appropriate position between the end of the duct 42 on the gas discharge port 23 side and the end of the duct 42 on the combustion furnace 41 side. The path L1 for feeding the oxygen-containing gas may be connected to the duct 42 at a plurality of positions (for example, a plurality of positions along the moving direction of the pyrolysis gas). When the oxygen-containing gas is fed to the duct 42 from a plurality of positions, the feed rates of the oxygen-containing gas may be different from each other depending on the feeding positions.

[Operation]

The biomass carbonizing apparatus 100 feeds oxygen-containing gas to the duct 42 from the oxygen-containing gas feed unit (the gas feed source 43 and the path L1). By doing this, tar generated in the rotary kiln 2 as a carbonization furnace can be combusted in the duct 42. As a result, it is possible to prevent clogging of the facility due to adhesion of tar in the duct 42. In addition, by feeding the oxygen-containing gas into the furnace during operation of the rotary kiln 2, which is a carbonization furnace, the number of stoppages of the facility for the purpose of cleaning work or the like can be reduced, and the biomass carbonizing apparatus 100 can more efficiently carbonize the biomass.

Conventionally, there has been known a configuration in which pyrolysis gas generated by carbonization of molded biomass (WP) in the rotary kiln 2 is combusted in the combustion furnace 41, and exhaust gas from the combustion furnace 41 is used as a heat source for heating in the rotary kiln 2. In the case of such a configuration, there is a problem that tar is easily deposited in the duct 42 provided between the kiln main body 20 of the rotary kiln 2 and the combustion furnace 41. When the deposition of tar proceeds in the duct 42, it may cause clogging of the facility. Although it can be presumed that tar adhered in the duct 42 is removed by cleaning work, it is necessary to stop operation of the facility, and there is a problem in terms of the operation efficiency of the facility. On the other hand, as described above, by adopting a configuration capable of combusting tar during operation of the rotary kiln 2, the number of times that cleaning work or the like is performed after stopping the facility can be reduced, as a result of which the biomass carbonization work using the biomass carbonizing apparatus 100 can be more efficiently performed.

The oxygen concentration in the gas in the duct 42 after feeding the oxygen-containing gas may be 10% by volume or less. In the biomass carbonizing apparatus 100 described above, the gas discharged from the rotary kiln 2 as a carbonization furnace may contain dust or the like, and in this case, it is conceivable that an explosion may occur. On the other hand, by adjusting the oxygen concentration in the gas in the duct 42 after feeding the oxygen-containing gas to 10% by volume or less, it is possible to combust tar in the duct 42 while reducing the possibility of explosion in the duct 42.

The carbonization temperature in the rotary kiln 2 (kiln main body 20) as a carbonization furnace may be 300° C. or lower. When the carbonization temperature is 300° C. or lower, tar in the gas discharged from the carbonization furnace contains a large amount of residual volatile components derived from biomass. Consequently, when tar is combusted in the duct 42, there is a high possibility of explosion. Thus, when the carbonization temperature is 300° C. or lower, the effect of avoiding explosion is more remarkably exhibited by adjusting the oxygen concentration in the gas in the duct 42 after feeding the oxygen-containing gas to 10% by volume or less.

Although the embodiments of the present disclosure have been described above, the present disclosure is not limited to the above embodiments, and various modifications can be made.

For example, the configuration, arrangement, and the like of each unit of the biomass carbonizing apparatus 100 including the rotary kiln 2 can be appropriately changed. For example, the shape and arrangement of the introduction port of molded biomass, the discharge port of the biomass solid fuel, and the like can also be appropriately changed. In addition, the biomass carbonizing apparatus 100 may be an apparatus that carbonizes at least biomass, and the biomass after carbonization may be used for applications other than a biomass solid fuel.

REFERENCE SIGNS LIST

1 Hopper
2 Rotary kiln
3 Cooler
4 Gas treatment facility
20 Kiln main body
21 Introduction port
22 PBT discharge port
23 Gas discharge port
30 Heating unit
31 Gas inlet
32 Gas outlet
33 Heat gas path
35 Cyclone
37 Induced draft fan
41 Combustion furnace
42 Duct
43 Gas feed source
44 Air fan
45 Oxygen-containing gas feed unit
100 Biomass carbonizing apparatus
L1 Path (oxygen-containing gas feed path)

The invention claimed is:

1. A biomass carbonizing apparatus comprising:

a carbonization furnace which is an externally heated rotary kiln configured to carbonize biomass generating a pyrolysis gas containing dust;

a combustion furnace configured to combust gas discharged from the carbonization furnace;

a duct connecting the carbonization furnace and the combustion furnace to introduce the pyrolysis gas containing dust generated by the carbonization furnace to the combustion furnace;

a gas supply path connected to the duct; and a gas supply source for supplying oxygen-containing gas to the path during operation of the carbonization furnace, wherein the gas supply source and the gas supply path are configured to supply the oxygen-containing gas into the duct to combust tar generated in the carbonization furnace within the duct, thereby preventing adhesion of the tar, wherein the carbonization furnace is heated by hot gas generated in the combustion furnace, wherein a carbonization temperature in the carbonization furnace is 300° C. or lower, wherein an oxygen concentration in the carbonization furnace is 10% by volume or less, and wherein an oxygen concentration in gas in the duct after feeding the oxygen-containing gas is 10% by volume or less to suppress a dust explosion within the duct.

* * * * *